(12) United States Patent
Siepker et al.

(10) Patent No.: US 12,374,945 B2
(45) Date of Patent: Jul. 29, 2025

(54) ROTOR FOR AN ELECTRIC MACHINE HAVING A RADIAL COOLING DUCT IN THE LAMINATED CORE

(71) Applicant: Valeo eAutomotive Germany GmbH, Erlangen (DE)

(72) Inventors: Carsten Siepker, Bad Neustadt a.d.Saale (DE); Christoph Wieczorek, Bad Neustadt a.d.Saale (DE); Regina Bach, Bad Neustadt a.d.Saale (DE); Nico Wolf, Bad Neustadt a.d.Saale (DE); Alexander Schlereth, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 241 days.

(21) Appl. No.: 18/060,663

(22) Filed: Dec. 1, 2022

(65) Prior Publication Data
US 2023/0179051 A1     Jun. 8, 2023

(30) Foreign Application Priority Data

Dec. 6, 2021 (DE) ...................... 10 2021 213 812.8

(51) Int. Cl.
*H02K 1/32* (2006.01)
*B60L 50/51* (2019.01)
(Continued)

(52) U.S. Cl.
CPC ................ *H02K 1/32* (2013.01); *B60L 50/51* (2019.02); *H02K 1/24* (2013.01); *H02K 3/24* (2013.01); *H02K 9/19* (2013.01); *B60L 2220/14* (2013.01)

(58) Field of Classification Search
CPC .. H02K 9/19; H02K 3/24; H02K 1/32; H02K 1/24; H02K 3/51; B60L 50/51; B60L 2220/14
(Continued)

(56) References Cited

U.S. PATENT DOCUMENTS

| 6,784,586 B2 * | 8/2004 | Akemakou .......... H02K 21/042 |
| | | 310/194 |
| 7,411,323 B2 * | 8/2008 | Pfannschmidt .......... H02K 1/32 |
| | | 310/58 |

(Continued)

FOREIGN PATENT DOCUMENTS

| CN | 111769674 A | 10/2020 |
| DE | 102015214158 A1 | 6/2016 |

(Continued)

OTHER PUBLICATIONS

Search Report issued in corresponding German Application No. 10 2021 213 812.8, dated Aug. 3, 2022 (8 pages).
(Continued)

*Primary Examiner* — Alex W Mok
(74) *Attorney, Agent, or Firm* — Osha Bergman Watanabe & Burton LLP (57) ABSTRACT

A rotor for an electric machine is disclosed. The rotor has a rotor shaft, a laminated core arranged on the rotor shaft and a plurality of stacked electrical laminations. The rotor also includes a first end plate arranged on an axial side of the laminated core and having radial protrusions arranged along its circumference, a second end plate arranged on the opposite axial side of the laminated core and having radial protrusions arranged along its circumference, a plurality of rotor windings which are each wound around a protrusion of the first end plate and around an axially opposite protrusion of the second end plate. A central cooling duct runs in the rotor shaft for supplying a coolant, and a radial cooling duct (Continued)

runs outwards from the central cooling duct in the laminated core. In addition, an electric machine and a vehicle having an electric machine of this type are described.

11 Claims, 6 Drawing Sheets

(51) Int. Cl.
    *H02K 1/24*     (2006.01)
    *H02K 3/24*     (2006.01)
    *H02K 9/19*     (2006.01)

(58) Field of Classification Search
    USPC ............................................................ 310/61
    See application file for complete search history.

(56) References Cited

U.S. PATENT DOCUMENTS

| | | | |
|---|---|---|---|
| 8,120,227 B2 * | 2/2012 | Leroy | H02K 9/223 |
| | | | 310/214 |
| 10,148,145 B2 | 12/2018 | Yang et al. | |
| 10,819,171 B2 * | 10/2020 | Lee | H02K 7/14 |
| 2003/0030333 A1 | 2/2003 | Johnsen | |
| 2007/0024129 A1 * | 2/2007 | Pfannschmidt | H02K 1/20 |
| | | | 310/59 |
| 2007/0120429 A1 * | 5/2007 | Howard | H02K 3/24 |
| | | | 310/214 |
| 2007/0194638 A1 | 8/2007 | Birdi et al. | |
| 2010/0320850 A1 * | 12/2010 | Lemmers, Jr. | H02K 1/32 |
| | | | 310/54 |
| 2016/0164374 A1 | 6/2016 | Yang et al. | |
| 2016/0211713 A1 | 7/2016 | Patel et al. | |

FOREIGN PATENT DOCUMENTS

| | | |
|---|---|---|
| DE | 102018220810 A1 | 6/2020 |
| EP | 2985885 A1 | 2/2016 |

OTHER PUBLICATIONS

Search Report issued in European Application No. 22207137.5 mailed on May 9, 2023 (10 pages).

* cited by examiner

ROTOR FOR AN ELECTRIC MACHINE HAVING A RADIAL COOLING DUCT IN THE LAMINATED CORE

The invention relates to a rotor for an electric machine, to an electric machine having a rotor, and to a vehicle having an electric machine.

The rotor has a rotor shaft and a laminated core arranged on the rotor shaft and formed from stacked electrical laminations. The rotor belongs together with a stator and a housing to an electric machine.

Electric machines of this type are increasingly used in electrically driven vehicles and hybrid vehicles, predominantly as electric motors for driving a wheel or an axle of such a vehicle.

Such an electric motor is normally mechanically coupled to a gearbox for rotational speed adaptation. The electric motor is additionally generally electrically coupled to an inverter which, from DC voltage that is provided from a battery, generates AC voltage, for example multi-phase AC voltage, for the operation of the electric motor.

It is also possible to operate an electric machine having such a rotor as a generator for recovering kinetic energy of a vehicle. For this purpose, the kinetic energy is first converted into electrical energy and then into chemical energy of a vehicle battery.

In a certain type of electrically excited synchronous motors (EESM), the rotor has rotor windings which are fed with direct current in order to generate a magnetic excitation field. If a rotating field is generated with the stator windings of an associated stator, this brings about an action of force on the rotor such that the latter rotates synchronously to the stator rotating field.

However, the rotor windings are greatly heated in the process, and therefore cooling is required. The cooling may be undertaken, for example, by spraying oil onto the axial sides of the rotor. However, this type of cooling is only superficial and therefore has little effect.

The invention is therefore based on the object of specifying a rotor for an electric machine which can be better cooled during operation.

To achieve this object, a rotor having the features of claim 1 is provided.

The rotor according to the invention comprises a first end plate arranged on an axial side of the laminated core and having radial protrusions arranged along its circumference, a second end plate arranged on the opposite axial side of the laminated core and having radial protrusions arranged along its circumference, a plurality of rotor windings which are each wound around a protrusion of the first end plate and around an axially opposite protrusion of the second end plate, a central cooling duct running in the rotor shaft, for supplying a coolant, and a radial cooling duct which runs outwards from the central cooling duct in the laminated core.

The invention is based on the finding that improved cooling can be achieved by the coolant being supplied by a central cooling duct formed in the rotor shaft. From said central cooling duct, the coolant flows through a radial cooling duct which runs outwards from the central cooling duct in the laminated core. In this way, the laminated core is firstly cooled by the direct contact with the rotor shaft. In addition, the rotor windings located further on the outside are also cooled. Overall, substantially better cooling in comparison to the above-mentioned spraying of the axial sides of a rotor can be achieved in this way.

Instead of only one radial (or radially running) cooling duct, the rotor can also have a plurality of radial cooling ducts which each run outwards from the central cooling duct in the laminated core.

The radial protrusions arranged along the circumference of an end plate may also be referred to as "teeth" or "plate extensions" and serve, inter alia, for holding the rotor windings in a certain position.

It is preferred, in the rotor according to the invention, that the radial cooling duct leads into an axial cooling duct which runs between two adjacent rotor windings. The rotor windings can therefore be cooled particularly well. After passing through the axial cooling duct, the coolant can flow out of the rotor.

Instead of only one axial (or axially running) cooling duct, the rotor can also have a plurality of axial cooling ducts, into each of which another of the radial cooling ducts leads.

The axial cooling duct is preferably covered by a pole separator which extends axially between the two rotor windings. The pole separator can consequently form the radial outer side of the axial cooling duct, with the radial inner side of the axial cooling duct being able to be formed by the laminated core. Furthermore, two sides of the axial cooling duct each connecting the inner side and outer side are formed by the two rotor windings. It is possible for each axial cooling duct of the rotor, into which a radial cooling duct leads, to be covered in such a way.

In a further refinement of the invention, provision can be made that the radial cooling duct is lined at its outer end with an insulation insert which separates the two rotor windings from the laminated core. In this way, the rotor windings are electrically insulated from the laminated core.

According to a preferred exemplary embodiment of the invention, the radial cooling duct can be at least approximately arranged in the centre between the axial sides of the laminated core. In this way, the laminated core is divided into two halves which are at least approximately identical in size and are cooled from the centre of the laminated core.

Also within the scope of the invention, the laminated core has a duct plate which is arranged between the electrical laminations and in which the radial cooling duct runs. A first variant makes provision that the radial cooling duct is formed by the duct plate itself. The radial cooling duct is surrounded or enclosed here by the duct plate which can be formed, for example, as a hollow profile. A second, alternative variant makes provision that the radial cooling duct is formed by the duct plate and an electrical lamination together. For this purpose, the duct plate can have a groove in which the radial cooling duct runs, the groove being covered by an electrical lamination which axially delimits the radial cooling duct.

In the case of the rotor according to the invention, the duct plate can comprise a metal alloy or can be produced from a metal alloy. The metal alloy is preferably an aluminium alloy. Optionally, the duct plate can be coated with an electrically non-conductive material, for example plastic.

The first end plate and/or the second end plate are or is preferably covered in each case axially by an end cap into which the axial cooling duct leads. For this purpose, a cavity which receives coolant which has emerged from the axial cooling duct can be formed between end cap and end plate.

A development of the invention makes provision that the end cap has an axial outlet which is arranged offset radially inwards with respect to the axial cooling duct. Coolant can emerge out of the end cap through the outlet. During operation of the rotor according to the invention, coolant first of all accumulates in the radially outer region of the cavity by means of the centrifugal force. The offset means that the coolant only emerges from the outlet if the accumulated coolant exceeds a certain volume. It is thereby ensured that coolant is permanently located in the axial cooling duct despite the outlet. Sufficient cooling of the rotor according to the invention is thereby always ensured.

In addition, the invention relates to an electric machine having a rotor of the type described and a stator which surrounds the rotor and with respect to which the rotor can be rotated. The stator can have a further laminated core (stator core) which is formed from stacked electrical laminations. In addition, the stator can have windings of electrical conductors, for example in the form of coil windings or flat wire windings.

Furthermore, the invention relates to a vehicle having such an electric machine which is provided for driving the vehicle. The machine can in particular drive a wheel or an axle of the vehicle.

The invention will be discussed below on the basis of exemplary embodiments with reference to the figures. The figures are schematic illustrations in which.

Figure 1:
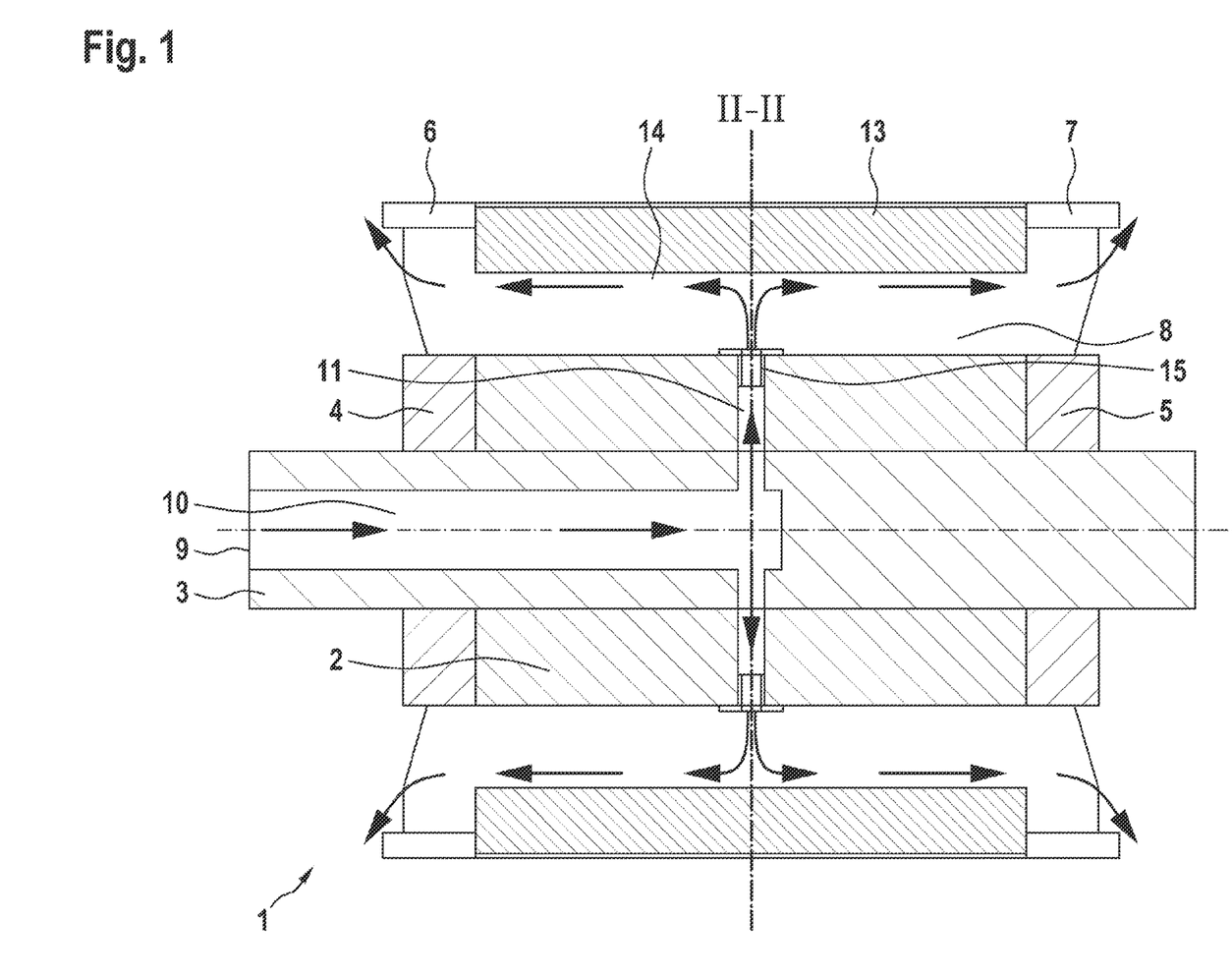
FIG. 1 shows a sectioned side view of a rotor according to the invention according to a first exemplary embodiment.

The rotor 1 which is shown in a sectioned side view in FIG. 1 is provided for an electric machine which is used for driving a vehicle. The rotor 1 comprises a cylindrical laminated core 2 which is formed from stacked electrical laminations and surrounds a rotor shaft 3 with a form fit and/or force fit. The electrical laminations can be identically formed punched parts.

A first end plate 4 is located on a first axial side of the laminated core 2. A second end plate 5 is located on the opposite, second axial side of the laminated core 2. The end plates 4, 5 have radial protrusions 6, 7 (also "plate extensions"), around which rotor windings 8 are wound. The two end plates 4, 5 each have an aluminium core which is insert moulded with plastic.

The rotor shaft 3 is hollow and, on its axial side on the left in FIG. 1, has an inlet 9 for coolant, which can comprise, inter alia, oil. A central cooling duct 10 extends from the inlet 9 axially approximately over half the length of the rotor shaft 3. The inlet 9 and the central cooling duct 10 are components of a coolant circuit in which the coolant circulates. From the end of the central cooling duct 10, which is located approximately in the centre of the rotor shaft 3, a radial cooling duct 11 extends outwards in the laminated core 2.

Figure 2:
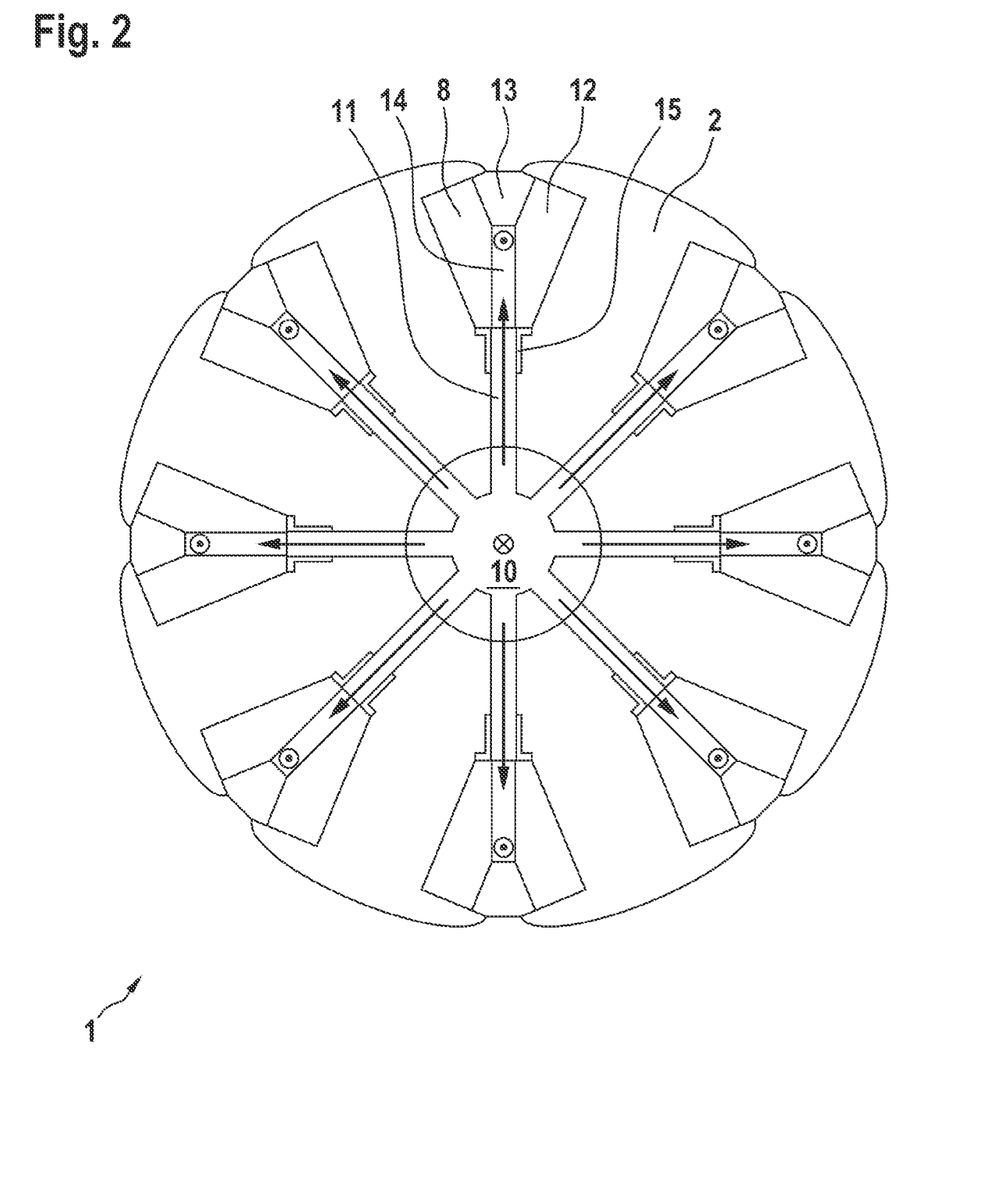
FIG. 2 shows a section along line II-II of FIG. 1.

FIG. 2 shows a section along the line II-II in FIG. 1. It is seen there that there are a total of eight identically configured radial cooling ducts 11 which run outwards in a star-shaped manner from the central cooling duct 10.

In the figures, the direction of flow of the coolant is depicted symbolically by arrows. In addition, a small circle containing a cross denotes coolant flowing into the plane of the drawing, and a small circle containing a point denotes coolant flowing out of the plane of the drawing.

The radial cooling ducts 11 extend through the laminated core 2 and lead in each case between two adjacent rotor windings 8, 12. The axial cooling ducts 14 are each covered at their radially outer end by a pole separator 13.

With reference again to FIG. 1, it is seen there that an axial cooling duct 14 in each case adjoins the radial cooling ducts 11. An insulation insert 15 in the form of a tube with a collar lines the outer end of the radial cooling duct 11 and separates the two rotor windings 8, 12 from the laminated core 2. The axial cooling duct 14 extends between the two axial sides of the rotor 1 and ends on both sides in the region of the winding heads of the rotor windings 8. At each end of the axial cooling duct 14 there is an axial outlet, not illustrated specifically in FIG. 1, for the coolant, through which the coolant can leave the rotor 1. The coolant can be collected in a pump sump and pumped again through the coolant circuit of the rotor 1.

Figure 3:
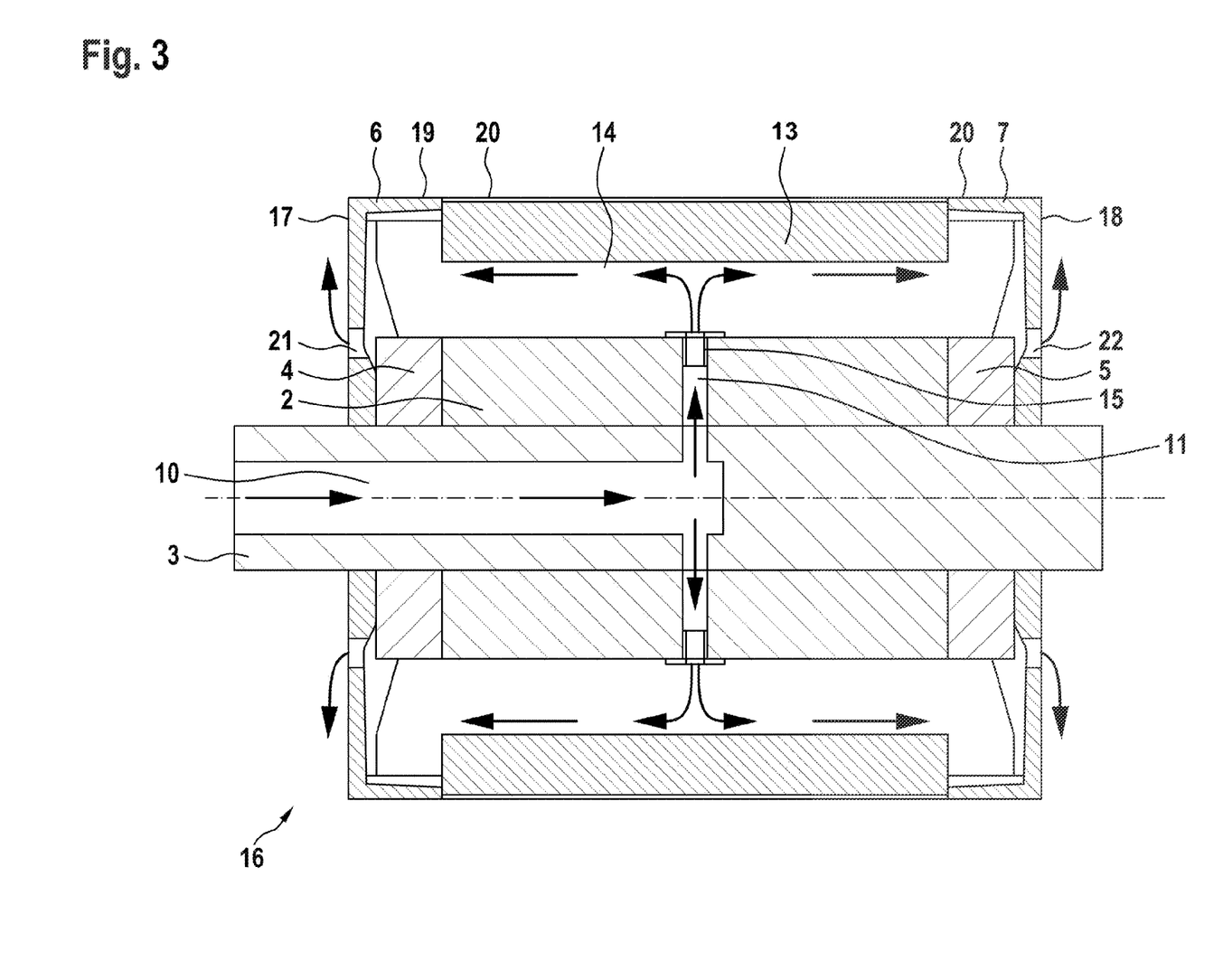
FIG. 3 shows a sectioned side view of a rotor according to the invention according to a second exemplary embodiment.

FIG. 3 is a similar view to FIG. 1 and shows a second exemplary embodiment of a rotor 16 according to the invention. Those components which correspond to components of the first exemplary embodiment will not be discussed once again in detail.

In accordance with the first exemplary embodiment, the rotor 16 has a rotor shaft 3, a laminated core 2 and rotor windings. The axial sides of the rotor 16 are covered by end caps 17, 18. Each end cap 17, 18 has an axial portion 19, 20 which is connected flush to a cylindrical casing, as a result of which a housing of the rotor 16 is formed.

The end caps 17, 18 each have a plurality of axial outlets 21, 22 which are distributed along their circumference and through which coolant, after flowing through an axial cooling duct 14, can leave the rotor 16. The outlets 21, 22 are offset radially inwards in relation to the axial cooling duct 14. This ensures that, during the operation of the electric machine, the winding heads of the rotor windings 8 are always cooled. This is because, during rotation of the rotor 16, the coolant is collected radially outwards in the region of the winding heads under the influence of the centrifugal force, as a result of which the winding heads are permanently wetted with coolant. Only if so much coolant has accumulated there that it passes as far as the outlets 21, 22 located radially further inwards can the coolant emerge from the rotor 16.

Figure 4:
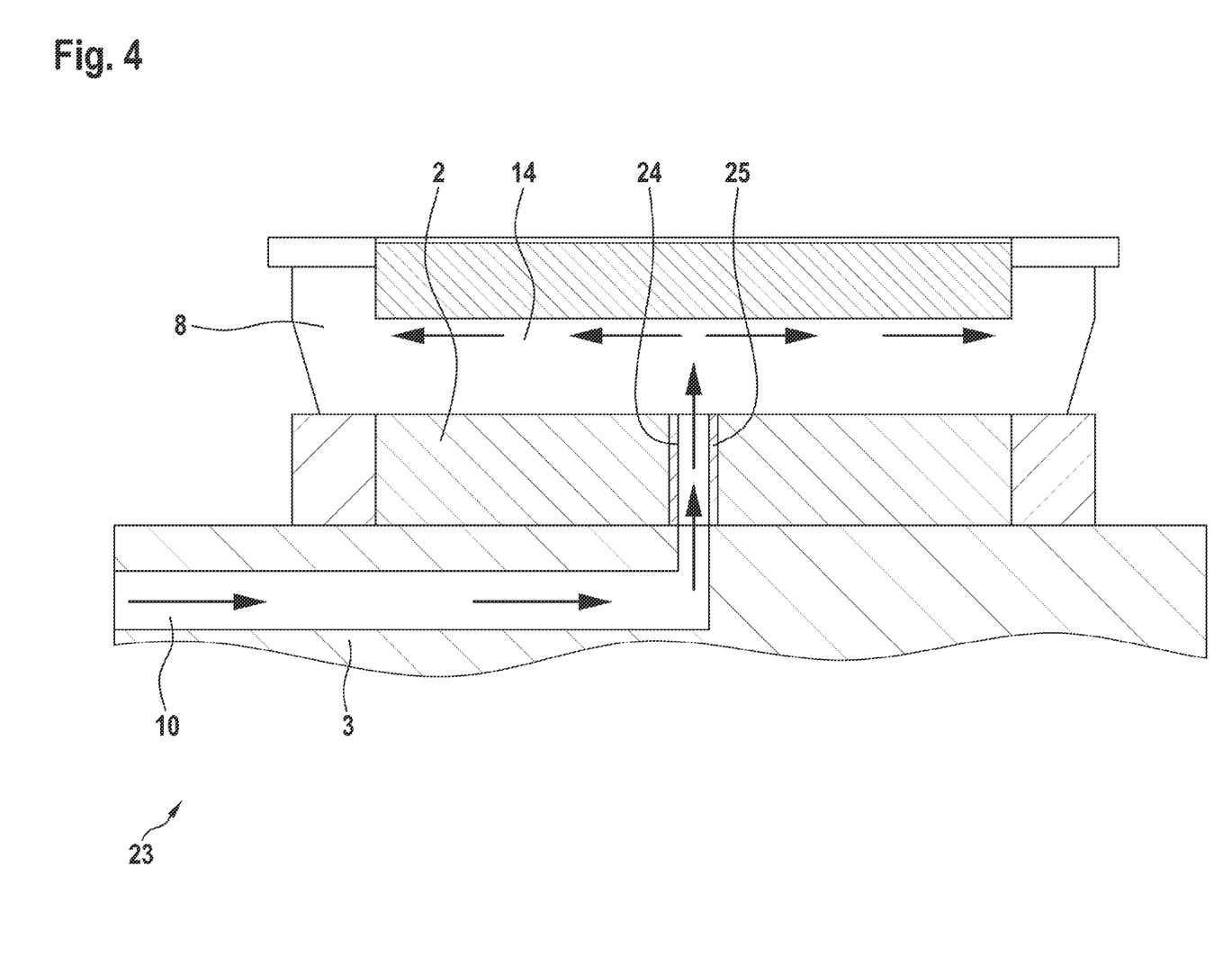
FIG. 4 shows a sectioned side view of a rotor according to the invention according to a third exemplary embodiment.
Figure 5:
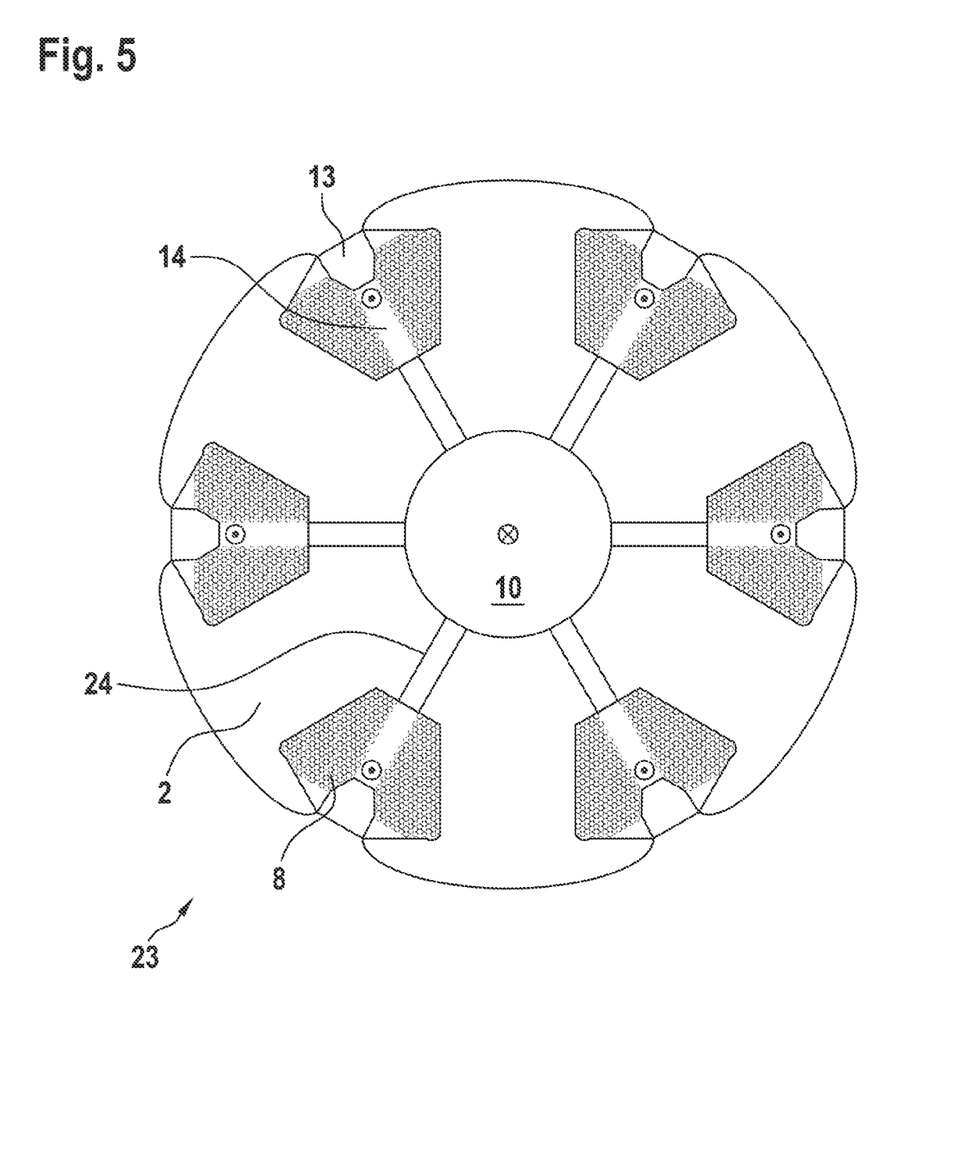
FIG. 5 shows a schematic view of the rotor shown in FIG. 4, as seen in the axial direction.

FIG. 4 shows a sectioned side view of a third exemplary embodiment of the rotor 23 according to the invention, and FIG. 5 is a view of the rotor 23 in the axial direction. Those components which correspond to the components of the previous exemplary embodiments will in turn not be discussed once again.

It is seen in FIG. 4 that a radial cooling duct 24 which leads into an axial cooling duct 14 branches off from a central cooling duct 10 in the rotor shaft 3. The radial cooling duct 24 is at least approximately arranged in the centre of the laminated core 2. At this location, the laminated core has a duct plate 25 in which the radial cooling duct 24 runs. In the exemplary embodiment illustrated, the duct plate 25 is hollow, that is to say the duct plate 25 surrounds or encloses the radial cooling duct 24 along its entire circumference. In other exemplary embodiments of the invention, the duct plate 25 can also have a groove in which the radial cooling duct 24 runs, the cooling duct 24 being covered or axially delimited by an electrical lamination.

FIG. 5 is a similar view to FIG. 4 and shows that the rotor 23 has a total of six radial cooling ducts 24 distributed over the circumference. Each cooling duct 24 is located between two adjacent rotor windings 8. Since the coolant flows from the central cooling duct 10 via the radial cooling ducts 24 and further through the axial cooling ducts 14, radially outer regions of the rotor 23, in particular the rotor windings 8, are cooled.

Figure 6:
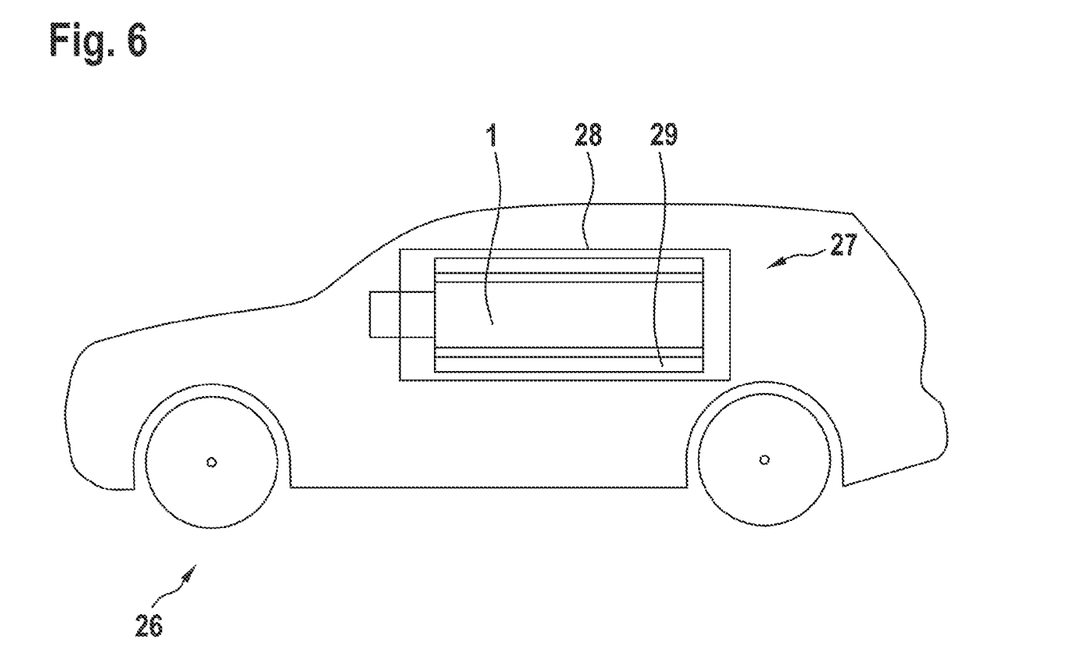
FIG. 6 shows a vehicle according to the invention having an electric machine which has a rotor according to the invention.

FIG. 6 schematically shows a vehicle 26 having an electric machine 27 which serves for driving the vehicle 26. The electric machine 27 has a housing 28 in which the rotor 1 and a stator 29, which surrounds the rotor 1, are accommodated.

LIST OF REFERENCE SIGNS

1 Rotor
2 Laminated core
3 Rotor shaft
4 End plate
5 End plate
6 Protrusion
7 Protrusion
8 Rotor winding
9 Inlet
10 central cooling duct
11 radial cooling duct
12 Rotor winding
13 Pole separator
14 axial cooling duct
15 Insulation insert
16 Rotor
17 End cap
18 End cap
19 axial portion
20 axial portion
21 Outlet
22 Outlet
23 Rotor
24 radial cooling duct
25 Duct plate
26 Vehicle
27 Electric machine
28 Housing
29 Stator

The invention claimed is:

1. A rotor for an electric machine, comprising:
a rotor shaft,
a laminated core arranged on the rotor shaft and having a plurality of stacked electrical laminations,
a first end plate arranged on an axial side of the laminated core and having radial protrusions arranged along its circumference,
a second end plate arranged on the opposite axial side of the laminated core and having radial protrusions arranged along its circumference,
a plurality of rotor windings which are each wound around a protrusion of the first end plate and around an axially opposite protrusion of the second end plate,
a central cooling duct running in the rotor shaft, for supplying a coolant, and
a radial cooling duct which runs outwards from the central cooling duct in the laminated core,
wherein the laminated core has a duct plate which is arranged between the electrical laminations and in which the radial cooling duct runs.

2. The rotor according to claim 1, wherein the radial cooling duct leads into an axial cooling duct which runs between two adjacent rotor windings.

3. The rotor according to claim 2, wherein the axial cooling duct is covered by a pole separator which extends axially between the two rotor windings.

4. The rotor according to claim 2, wherein the radial cooling duct is lined at its outer end with an insulation insert which separates the two rotor windings from the laminated core.

5. The rotor according to claim 1, wherein the radial cooling duct is at least approximately arranged in the centre between the axial sides of the laminated core.

6. The rotor according to claim 1, wherein the radial cooling duct is formed by the duct plate by itself or by the duct plate and an electrical lamination.

7. The rotor according to claim 1, wherein the duct plate comprises aluminium or a metal alloy.

8. The rotor according to claim 1, wherein the first end plate and/or the second end plate are or is covered in each case axially by an end cap into which the axial cooling duct leads.

9. The rotor according to claim 8, wherein the end cap has an axial outlet which is arranged offset radially inwards with respect to the axial cooling duct.

10. An electric machine comprising: a rotor according to claim 1; and a stator surrounding the rotor.

11. A vehicle having an electric machine according to claim 10 which is provided for driving the vehicle.

* * * * *